United States Patent Office 3,063,685
Patented Nov. 13, 1962

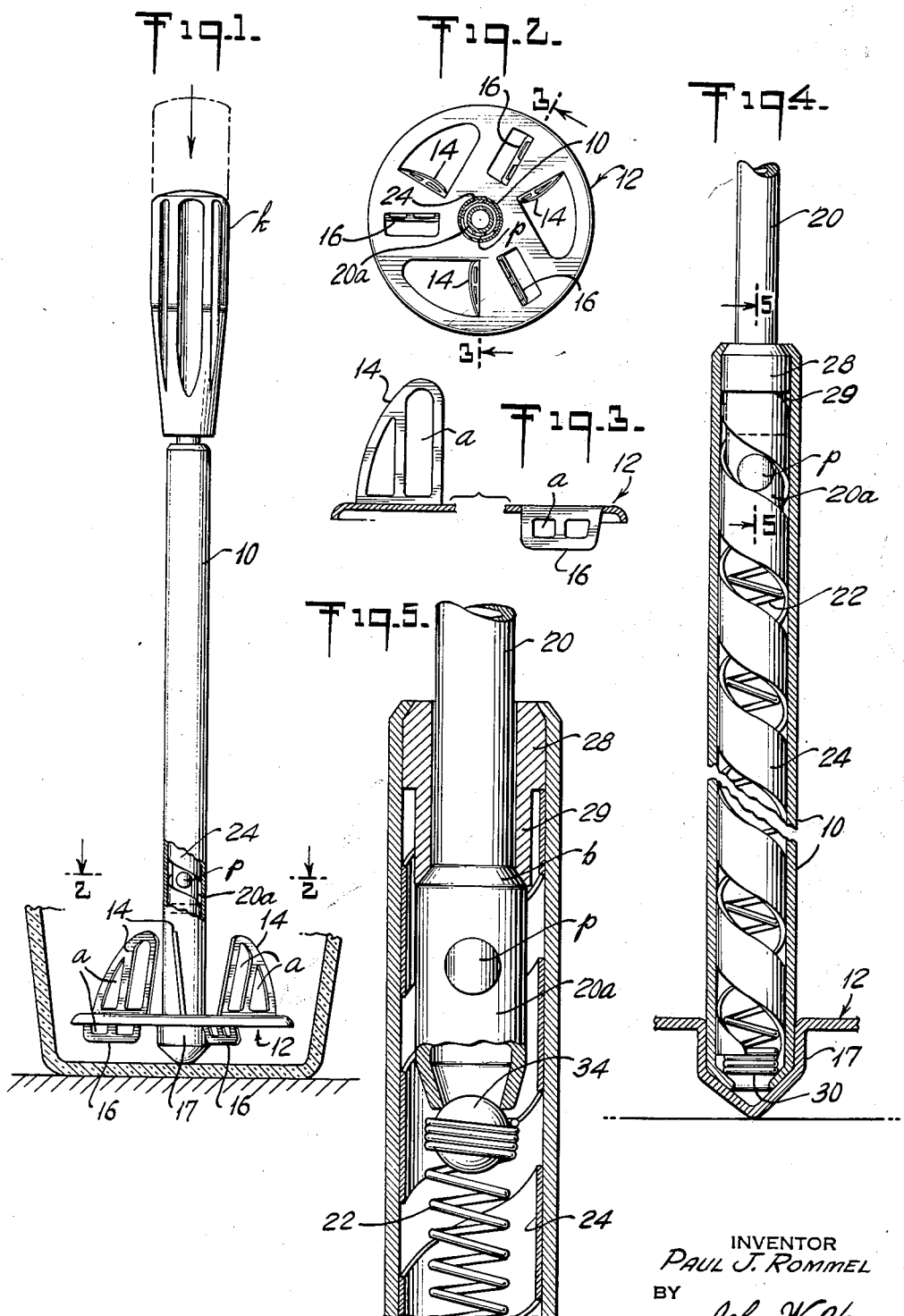

3,063,685
MIXING DEVICE
Paul J. Rommel, 35—25 77th St., Jackson Heights, N.Y.
Filed Dec. 11, 1959, Ser. No. 859,002
4 Claims. (Cl. 259—135)

This invention relates to a mixing device of the kind which is rotated first in one direction and then in the opposite direction by actuation of a reciprocable plunger. The device is well adapted for stirring and mixing liquids, for example, mixing egg yolks and milk or water in preparing scrambled eggs, whipping cream or mayonnaise, and a variety of similar uses.

There has been a need for a simple device which is adapted to do these things, and which is easy to clean, and hygienic. It is particularly useful where a small volume of material is being mixed. Devices such as the well-known "egg beater" are difficult to clean, and when used to mix or beat a small amount of material they cause a good deal of splattering. The device disclosed herein is entirely closed at its lower end, and all working parts are sealed in so that entrance of foreign material is effectively prevented. The mixing means is simple and all parts of it can be easily contacted as by a brush or a cloth.

Accordingly, it is an object of this invention to provide a mixing device which is simple and can be operated with one hand.

Another object of the invention is to provide a mixing device which is easy to clean.

Another object of the invention is to provide a mixing device which has an efficient mixing or whipping action wthout splatterng of the material being mixed or whipped.

Another object of the invention is to provide a device of the kind described which is particularly adapted for mixing or whipping a small amount of material.

The device will best be understood if the following description is read in connection with the drawing in which FIGURE 1 is an elevation, partly in cross-section;
FIGURE 2 is a top plan view of the mixing element;
FIGURE 3 is a detail view of the mixing element blades, taken on the line of 3, 3 of FIGURE 2;
FIGURE 4 is an elevation mostly in vertical section; and
FIGURE 5 is an elevation, partly in cross-section, taken on the line of 5, 5 of FIGURE 4.

The device disclosed herein comprises a tubular shank member 10 and a disc like member 12 fixed to the tubular member adjacent its lower end and projecting radially from the tubular member. Member 12 carries the blades 14 and 16 projecting at right angles to the plane of member 12. As shown herein, blades 14 project upwardly from member 12, and blades 16 project downwardly from member 12.

If made of plastic, members 10 and 12 could be cast and members 14, 16 and 17 all provided by the casting operation. If made of metal as shown herein the blades 14 and 16 may be formed by making partial cutouts in a disc and bending them to a position substantially at right angles to the plane of the disc, which, of course, can be done in a single stamping operation. The center of the disc is drawn downwardly forming the downwardly extending cup shaped portion 17 which defines the depression or concavity 18 in the upper surface of member 12.

In the illustrated embodiment of the invention the device rests on the downwardly extending projection 17 and the blades 16 are of less height than member 17, so that as the assembly comprising members 10 and 12 is rotated the blades 16 will not strike the bottom of the container in which materials are being mixed or whipped.

Member 12 is preferably circular, to minimize the effect of any contact between it and the side wall of a fluid container while member 12 is rotating.

It will be noted that each of the blades 14 and 16 is provided with a plurality of apertures a. These serve an important function in making this device efficient in operation, as will be more fully explained.

The mixing member 12 may be fixed to tubular member 10 in any suitable way. Very satisfactory results have been obtained by forming members 10 and 12 separately, and joining them together by force fitting the lower end of member 10 in the concavity 18 defined by the depressed portion 17 at the center of member 12.

The assembly comprising members 10 and 12 is rotated in one direction by moving plunger 20 downwardly by hand along a spiral path provided on the interior surface of member 10 and against the force of coil spring 22 contained within member 10. Coil spring 22 is compressed by the downward movement of plunger 20 and so acts to move plunger 20 upwardly, as soon as the force tending to depress the plunger is ended. In practice the user presses down on the plunger 20 intermittently, allowing the spring 22 to expand and thus raise the plunger in the intervals between down strokes. For convenience a knob k is provided on the upper end of plunger 20 and the user either grasps the knob or rests his hand on it in actuating the intermittent down strokes.

A spiral track may, if desired, be formed in the inner surface of tubular member 10. As shown herein, however, the spiral member 24 is forced into member 10, and has a diameter such that it fits so tightly against the inner surface of member 10 that there is no relative movement between the spiral 24 and the member 10.

The lower end of plunger 20 is enlarged providing the head 20a the lower end face of which is formed to provide a bearing surface for a circular bearing supported at the upper end of spring 22 as will be described. Projecting radially from the head 20a is a projection p which extends into and travels up and down in the spiral track defined by member 24. Around its upper end the head 20a is slightly bevelled at b to provide a suitable meeting surface to abut against the lower end of a skirt or circular flange 29 which projects downwardly from an annular cap or bushing 28 through which the plunger 22 extends.

Besides serving as a stop against which the head portion 20a of the plunger abuts at the upper end of its reciprocable movement bushing 28 provides a closure or seal around tubular member 10. It will be noted that in the assembled device the only opening into the tubular member 10 is from its top, which is disposed well above the level of the liquids or other material being mixed or whipped.

The coil spring 22 is disposed within the tubular member 10 and centrally of the spiral track defined by member 24. Its lower end extends below the lower end of the spiral track, and it is positively engaged at its lower end with the member 10. As shown, this is accomplished by forming its lower end of a plurality of rigid compacted turns 30 which frictionally engage the inner wall of member 10 adjacent its lower end and effectively prevent relative movement between members 10 and 22. At its upper end coil spring 22 also has a number of compacted turns 32 which provide a cage for the ball bearing 34 which rests in, and forms a universal joint with, the bearing surface provided by the lower end face of plunger head 20a.

The structure and arrangement of parts described above have been very effective in preventing bending of spring 22 intermediate its ends, which, if it occurred, would cause undesirable friction of the spring against the interior surface of the tubular member 10, or the means defining a spiral track on the inner surface of member 10.

It will be noted that the high point of blades 14 and 16 respectively is at the end adjacent to the center of member 12 and that the blades slope downwardly to their outer end.

As the member 12 rotates the solid portions of the blades 14 and 16 propel the material being mixed or whipped in the direction of rotation of member 12, and at the same time many different streams of the material are forced through the apertures *a* in a direction opposite to the direction of rotation of member 12. The result is to speed the mixing or whipping of materials, and to do so in a way which cuts down splattering, and avoids forcing the material up and over the wall of the container. The shape of the blades and the apertures in the blades lessen the centrifugal impulse which solid blades would give to the liquid, and thus there is better control of a liquid mass while it is being effectively mixed or whipped.

There has thus been provided a mixing device in which the above stated objects have been accomplished in a simple, practical and effective way.

What I claim is:

1. A device comprising a tubular shank member closed at its lower end, a circular disc projecting from said member adjacent its lower end and normal to its axis, means extending into the member from its top and reciprocal down and up within said shank member, and means within the member coactive with said reciprocable means to rotate said member around its axis while it is reciprocating, said circular disc having a number of perforated blades projecting substantially at right angles to the plane of the disc, said blades being characterized in that they slope downward from their inner ends to their outer ends respectively and have a number of substantially vertical extending portions spaced at different distances from the center of the disc which are graduated in height downwardly from the center of the disc towards the periphery.

2. The device claimed in claim 1 in which the said blades are higher at the inner ends, which is nearer the center of the disc and slope downwardly from their inner ends to their outer ends respectively and comprise apertures graduated in height downwardly from the inner ends of the blades.

3. The device claimed in claim 1 in which the center portion of the disc is depressed, forming a cup-like projection extending downwardly from the lower surface of the disc, and the said tubular shank member extends into the concavity defined by said depressed portion of the disc.

4. A mixing device comprising a disc having a tubular contact portion projecting below the center portion of the disc, a tubular shank member the lower end of which is closed and extends into, and engages with, the said tubular portion of the disc, reciprocable means extending into the top of said tubular shank member, and means within the said member coacting with said reciprocable means as it moves up and down within said tubular shank member to rotate the said member and said disc around the axis of said member, said disc comprising a number of radially disposed blades, one or more projecting upwardly and one or more projecting downwardly from the plane of the disc, and characterized by a number of substantially vertical portions graduated in height downwardly from the center toward the periphery of the disc being at least as high at the inner end as at the outer end.

References Cited in the file of this patent
UNITED STATES PATENTS

| | | |
|---|---|---|
| 1,613,318 | Fedler | Jan. 4, 1927 |
| 1,918,738 | Burrell | July 18, 1933 |
| 1,937,884 | Geldhof | Dec. 5, 1933 |
| 1,960,089 | Robb | May 22, 1934 |
| 2,045,171 | Wiegandt | June 23, 1936 |
| 2,073,540 | Tittle | Mar. 9, 1937 |
| 2,111,407 | Rommel | Mar. 15, 1938 |
| 2,879,044 | Gunas | Mar. 24, 1959 |

FOREIGN PATENTS

| | | |
|---|---|---|
| 91,473 | Austria | Feb. 26, 1923 |